(12) United States Patent
Campagnolo et al.

(10) Patent No.: US 10,323,455 B2
(45) Date of Patent: Jun. 18, 2019

(54) WINDOW CONTROL DEVICE (71) Applicant: AISIN SEIKI KABUSHIKI KAISHA, Kariya-shi, Aichi-ken (JP)

(72) Inventors: Tiago Lacerda Campagnolo, Sorocaba (BR); Tomoki Mitsuya, Nukata-gun (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 146 days.

(21) Appl. No.: 15/454,139

(22) Filed: Mar. 9, 2017

(65) Prior Publication Data
US 2017/0268279 A1 Sep. 21, 2017

(30) Foreign Application Priority Data
Mar. 15, 2016 (JP) ................. 2016-051569

(51) Int. Cl.
*E06B 9/24* (2006.01)
*B60J 3/04* (2006.01)
*E05F 15/70* (2015.01)
*B60J 1/17* (2006.01)
*G02F 1/01* (2006.01)
*E05F 15/689* (2015.01)

(52) U.S. Cl.
CPC ................. *E06B 9/24* (2013.01); *B60J 1/17* (2013.01); *B60J 3/04* (2013.01); *E05F 15/70* (2015.01); *G02F 1/0121* (2013.01); *E05F 15/689* (2015.01); *E05Y 2800/23* (2013.01); *E05Y 2900/55* (2013.01); *E06B 2009/2464* (2013.01)

(58) Field of Classification Search
CPC ....... E06B 9/24; B60J 3/04; B60J 1/17; E05F 15/70
See application file for complete search history.

(56) References Cited

U.S. PATENT DOCUMENTS

| 4,832,468 | A | * | 5/1989 | Ito | B60J 3/04 359/275 |
| 6,416,827 | B1 | | 7/2002 | Chakrapani et al. | |
| 6,580,472 | B1 | * | 6/2003 | Willingham | B60J 3/04 349/16 |
| 7,134,707 | B2 | * | 11/2006 | Isaac | B60J 3/04 296/97.6 |
| 7,245,205 | B2 | * | 7/2007 | Strohband | B32B 17/10532 296/146.1 |
| 8,143,563 | B2 | * | 3/2012 | Broude | B60J 3/04 250/203.4 |
| 8,482,834 | B2 | * | 7/2013 | Cordova | G02B 5/23 359/228 |
| 10,036,927 | B2 | * | 7/2018 | Iwata | G02F 1/137 |

(Continued)

FOREIGN PATENT DOCUMENTS

JP 2010-132142 6/2010

*Primary Examiner* — Justin B Rephann
(74) *Attorney, Agent, or Firm* — Finnegan, Henderson, Farabow, Garrett & Dunner, LLP (57) ABSTRACT

A window control device includes a window regulator and a light control device. The window regulator controls movement of a light control glass that is installed in a vehicle door and a light transmittance of which can be adjusted. The light control device controls the light transmittance of the light control glass. The light control device is attached to one of the components constituting the window regulator.

9 Claims, 7 Drawing Sheets (56) References Cited

U.S. PATENT DOCUMENTS

| | | | |
|---|---|---|---|
| 2005/0231336 A1* | 10/2005 | Strohband | B32B 17/10532 340/426.27 |
| 2006/0098290 A1* | 5/2006 | Fernando | B32B 17/10036 359/609 |
| 2008/0231934 A1* | 9/2008 | Knafou | B60J 3/04 359/245 |
| 2009/0015740 A1* | 1/2009 | Sagitov | B60J 3/04 349/16 |
| 2009/0058126 A1* | 3/2009 | Broude | B60J 3/04 296/97.2 |
| 2011/0303828 A1* | 12/2011 | Mikat | B60J 3/04 250/214 R |
| 2012/0140308 A1 | 6/2012 | Cordova | |
| 2013/0050797 A1* | 2/2013 | Takahashi | B60J 1/17 359/245 |
| 2014/0320946 A1* | 10/2014 | Tomkins | B60J 3/04 359/275 |
| 2015/0057896 A1* | 2/2015 | Yamane | B60J 5/047 701/49 |
| 2015/0283937 A1* | 10/2015 | Salter | B60Q 1/268 362/510 |
| 2016/0052374 A1* | 2/2016 | Volbracht | B60J 3/04 296/190.1 |
| 2016/0082812 A1* | 3/2016 | Okuda | B60J 3/04 49/323 |
| 2016/0104437 A1* | 4/2016 | Iwakawa | G02B 6/0011 345/690 |
| 2016/0318379 A1* | 11/2016 | Okuda | B60J 3/04 |
| 2016/0339768 A1* | 11/2016 | Ro | B60J 3/04 |
| 2017/0001496 A1* | 1/2017 | Wang | B60J 3/04 |
| 2018/0079284 A1* | 3/2018 | Choi | E05F 15/75 |

\* cited by examiner

| Pushing Direction \ Sliding Direction | First Position (Lock) | Second Position (Unlock) |
|---|---|---|
| Upper Position (Amount-of-Light Adjustment Prohibited) | <Lock Position><br>•D Movable<br>•P Immovable<br>•Amount-of-Light Adjustment Prohibited | <Unlock Position><br>•D Movable<br>•P Movable<br>•Amount-of-Light Adjustment Prohibited |
| Lower Position (Amount-of-Light Adjustment Permitted) | <Amount-of-Light Adjustment Position><br>•D Immovable<br>•P Immovable<br>•Amount-of-Light Adjustment Permitted | <Amount-of-Light Adjustment Position><br>•D Immovable<br>•P Immovable<br>•Amount-of-Light Adjustment Permitted |

WINDOW CONTROL DEVICE

BACKGROUND

The present invention relates to a window control device for controlling the light transmittance and movement of a light control glass in a vehicle door.

Technologies for controlling the light transmittance of window glasses installed in vehicle doors have been known (for example, US Patent Application Publication No. 2012/0140308). The technology of the publication adjusts the amount of light through a window glass based on operation of the operation panel attached to the inner panel of the vehicle door.

Further, a technology has been known that is used in a vehicle door provided with a window glass capable of adjusting light transmittance to remedy radio wave reduction through opening and closing control of a window glass (Japanese Laid-Open Patent Publication No. 2010-132142).

Generally, a vehicle door is equipped with a window regulator that controls movement of the window glass. An operation panel for controlling the light transmittance of the window glass is installed in the inner panel of the vehicle door. In this manner, the number of components installed in a vehicle door has been increasing in recent years. Such an increase in the number of components in vehicle doors increases the workload in the manufacture and the troublesomeness of the assembly.

SUMMARY

Accordingly, it is an objective of the present invention to provide a window control device capable of reducing the workload in the manufacture and the troublesomeness of the assembly.

To achieve the foregoing objective and in accordance with one aspect of the present invention, a window control device is provided that includes a window regulator that controls movement of a light control glass that is installed in a vehicle door and configured to be adjusted for its light transmittance, and a light control device that controls the light transmittance of the light control glass. The light control device is attached to one of components constituting the window regulator.

In accordance with another aspect of the present invention, a window control device is provided that includes a plurality of window regulators, a plurality of light control devices, and a restriction switch. The window regulators control movement of light control glasses that are installed in vehicle doors on a side of a driver's seat and on a side of a passenger seat. Each light control glass is configured to be adjusted for its light transmittance. The light control devices control the light transmittance of the light control glasses. The restriction switch commands the window regulators to restrict movement of the light control glasses and commands the light control devices to restrict the adjustment of the light transmittance of the light control glasses. The restriction switch includes a lock position, an unlock position, and an amount-of-light adjustment position. In the lock position, the restriction switch permits movement of the light control glass on the side of the driver's seat, prohibits movement of the light control glass on the side of the passenger seat, and prohibits the amount-of-light adjustment of the light control glass on the side of the driver's seat and the light control glass on the side of the passenger seat. In the unlock position, the restriction switch permits movement of the light control glass on the side of the driver's seat and the light control glass on the side of the passenger seat, and prohibits the amount-of-light adjustment of the light control glass on the side of the driver's seat and the light control glass on the side of the passenger seat. In the amount-of-light adjustment position, the restriction switch prohibits movement of the light control glass on the side of the driver's seat and the light control glass on the side of the passenger seat, and permits the amount-of-light adjustment of the light control glass on the side of the driver's seat and the light control glass on the side of the passenger seat.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

First Embodiment

Figure 1:
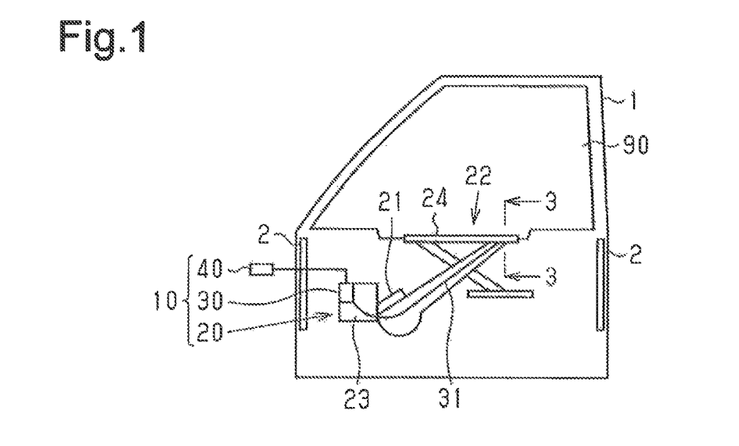
FIG. 1 is a schematic diagram showing a vehicle door equipped with a window control device.

With reference to FIG. 1, a window control device 10 according to a first embodiment will now be described. In the description of the window control device 10, the up-down direction of the window control device 10 is defined as follows. That is, when the vehicle is on a horizontal plane in a position that allows the vehicle to be driven, the direction along the vertical direction in the window control device 10 is defined as the up-down direction of the window control device 10.

The window control device 10 is mounted on a vehicle door 1 having a glass the amount of light through which can be controlled (hereinafter referred to as a light control glass 90). The window control device 10 includes a window regulator 20 that controls movement of the light control glass 90, a light control device 30 that controls the light transmittance of the light control glass 90, and an operation unit 40.

Figure 2:
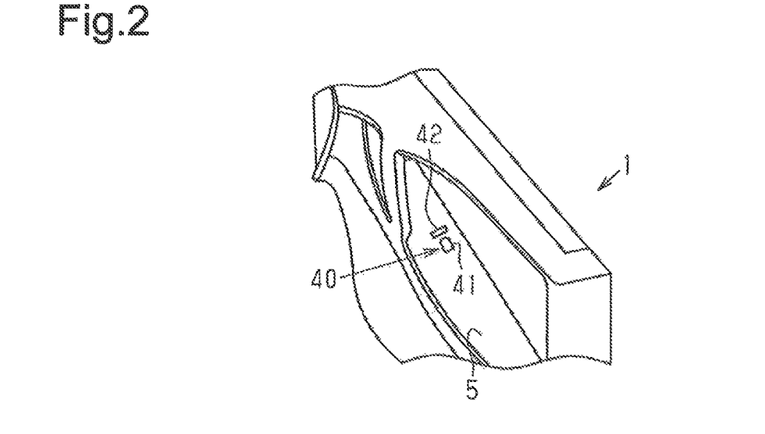
FIG. 2 is a perspective view of the vehicle door.

As shown in FIG. 2, the operation unit 40 is arranged in the inner panel of the vehicle door 1. For example, the inner panel is provided with a base 5 on which a hand can be arranged, and the operation unit 40 is located on the base 5.

Figure 3:
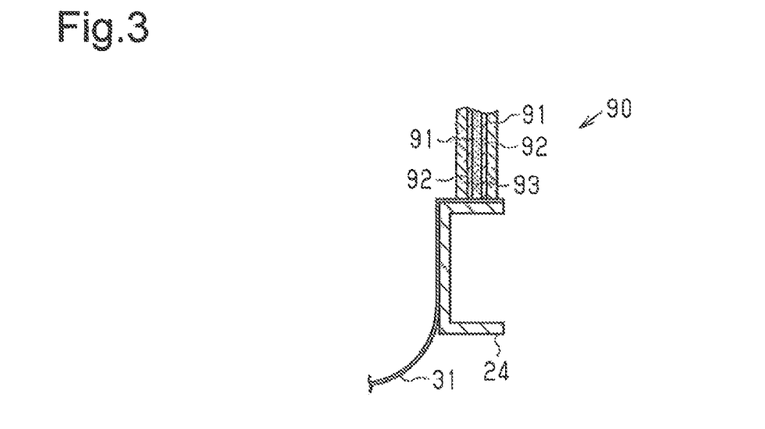
FIG. 3 is a cross-sectional view taken along line 3-3 of FIG. 1, showing the vehicle door.

As shown in FIG. 3, the light control glass 90 includes, for example, two transparent members 91, two transparent electrode layers 92 arranged inside the two transparent members 91, and a light transmission amount control layer 93 provided between the two transparent electrode layers 92. The light transmission amount control layer 93 is made of a material that changes the light transmittance by applying a voltage between the transparent electrode layers 92. The light transmission amount control layer 93 is made of, for example, a sheet including liquid crystal-containing microcapsules (hereinafter referred to as a liquid crystal sheet), electrochromic elements, and the like. The light control glass 90 is supported by two guides 2 arranged on the opposite sides in the front-rear direction of the light control glass 90. The guides 2 extend in the up-down direction and guide the light control glass 90 so as to open and close the window frame. Further, the lower portion of the light control glass 90 is fixed to a support member 24 of a power transmission mechanism 22 of the window regulator 20.

The window regulator 20 includes a motor 21, the power transmission mechanism 22 that moves the light control glass 90 with the power of the motor 21, and a motor control device 23 that controls the motor 21.

The power transmission mechanism 22 includes arms that are rotated by the power of the motor 21 to raise and lower the light control glass 90. The arms are assisted by a link mechanism to raise and lower the light control glass 90. Alternatively, the power transmission mechanism 22 may be configured to convert rotational power of the motor 21 into pulling force applied to a cable. In this case, a predetermined part of the cable is coupled to the lower part of the light control glass 90. As the cable moves, the light control glass 90 moves.

The motor 21 rotates in the forward direction and the reverse direction (the direction opposite to the forward direction). For example, when the motor 21 rotates in the forward direction, the light control glass 90 is moved upward by the power transmitted by the power transmission mechanism 22. When the motor 21 rotates in the reverse direction, the light control glass 90 is moved downward by the power transmitted by the power transmission mechanism 22.

The light control device 30 is attached to any of the components (preferably a fixed component) constituting the window regulator 20. For example, the light control device 30 is arranged in the vicinity of the motor control device 23 of the window regulator 20. In this case, the light control device 30 is attached to the housing of the motor control device 23 (see FIG. 1) or attached to the base plate to which the motor control device 23 is attached. A wiring 31 extending from the light control device 30 is connected to the light control glass 90.

The light control device 30 controls the manner of voltage application between the two transparent electrode layers 92 of the light control glass 90.

The light control device 30 controls the light transmittance of the light control glass 90 by increasing or reducing the potential difference between the two transparent electrode layers 92, 92 of the light control glass 90. For example, in a case where the light transmission amount control layer 93 is made of a liquid crystal sheet, an increase in the potential difference between the transparent electrode layers 92 through control performed by the light control device 30 increases the light transmittance of the light control glass 90. A reduction in the potential difference between the two transparent electrode layers 92 through control performed by the light control device 30 reduces the light transmittance of the light control glass 90.

The operation unit 40 is a device used to change the position and the light transmittance of the light control glass 90, and is operated by the driver or an occupant.

Figure 4:
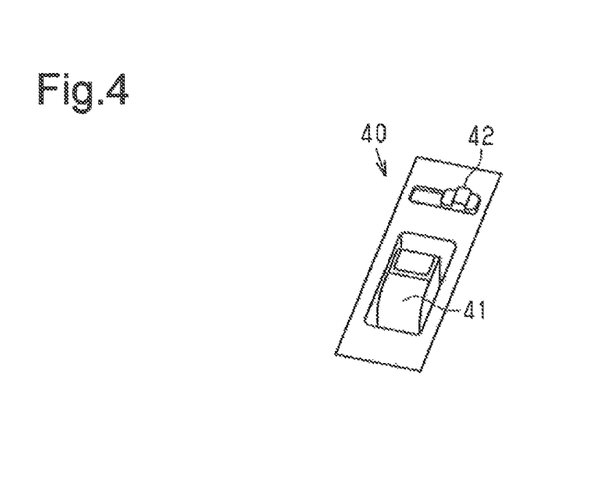
FIG. 4 is a perspective view of an operation unit.

As shown in FIG. 4, the operation unit 40 includes a control switch 41 and a changeover switch 42.

Figure 5:
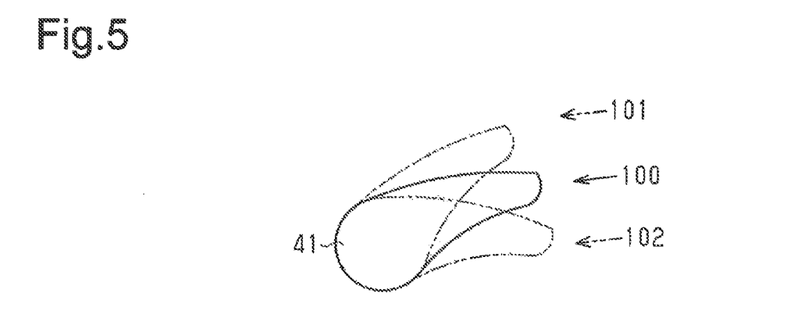
FIG. 5 is a schematic diagram showing action of a control switch.

The control switch 41 will now be described with reference to FIG. 5. The control switch 41 is an operation switch for causing a controlled object to act in a forward direction or in a reverse direction. The control switch 41 moves between an upper first position 101 and a lower second position 102. The movements of the control switch 41 include translation and rotation. In the example shown in FIG. 5, the control switch 41 is rotated to move between the first position 101 and the second position 102. The control switch 41 is preferably urged toward a reference position 100 between the first position 101 and the second position 102.

The first position 101 is set as an operation position for causing the controlled object to act in the forward direction. The second position 102 is set as an operation position for causing the controlled object to act in the reverse direction. The reference position 100 is set as an operation position in which the state of the controlled object is not changed, that is, in which the controlled object is not caused to act in either the forward direction or the reverse direction.

The controlled object includes the motor 21 of the window regulator 20 and the light control device 30. The forward and reverse directions of the motor 21 refer to the forward and reverse rotations. The forward and the reverse directions of the light control device 30 refer to an increase and a decrease in the potential difference between the two transparent electrode layers 92 of the light control glass 90.

Figure 6:
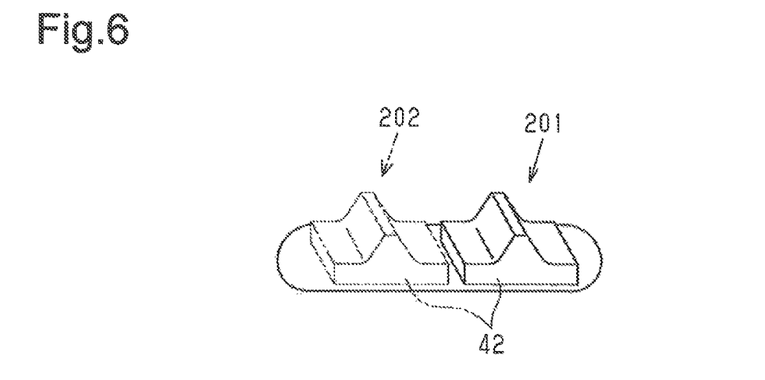
FIG. 6 is a schematic diagram showing action of a changeover switch.

The changeover switch 42 will now be described with reference to FIG. 6.

The changeover switch 42 switches the controlled object of the control switch 41. The changeover switch 42 moves between a first position 201 and a second position 202. The movements of the changeover switch 42 include translation and rotation. FIG. 6 illustrates an example in which the changeover switch 42 is slid to be translated.

The first position 201 is defined as a position for setting the controlled object of the control switch 41 to the motor 21 of the window regulator 20.

The second position 202 is defined as a position for setting the controlled object of the control switch 41 to the light control device 30.

Figure 7:
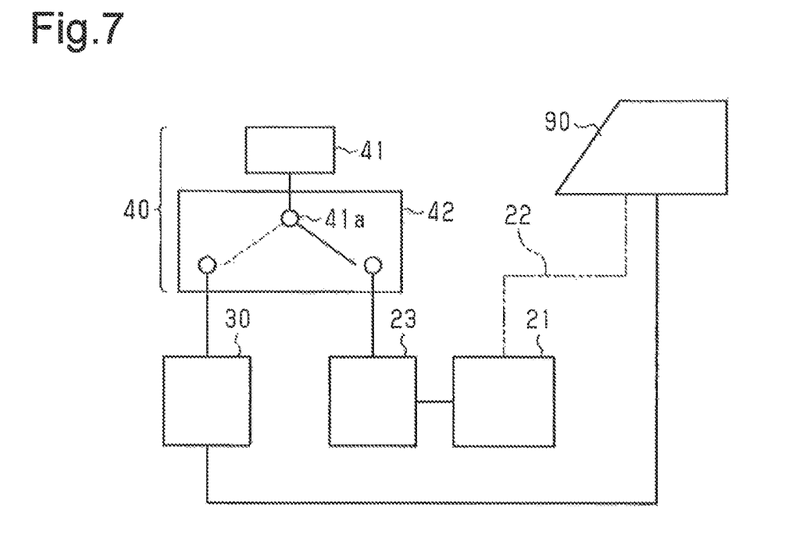
FIG. 7 is a block diagram of the window control device.

Operation of the changeover switch 42 will now be described with reference to FIG. 7.

When the changeover switch 42 is arranged in the first position 201, a connection terminal 41a of the control switch 41 is connected to the motor control device 23 of the window regulator 20, and is disconnected from the light control device 30. As a result, a signal corresponding to the operation of the control switch 41 is delivered to the motor control device 23, so that the motor control device 23 is controlled based on the operation of the control switch 41.

Also, when the changeover switch 42 is arranged in the second position 202, the connection terminal 41a of the control switch 41 is disconnected from the motor control device 23 of the window regulator 20, and is connected to the light control device 30. As a result, a signal corresponding to the operation of the control switch 41 is delivered to the light control device 30, so that the light control device 30 is controlled based on the operation of the control switch 41.

Next, operation of the light control glass 90 based on the operation of the operation unit 40 will be described.

As described above, the controlled object of the control switch 41 is either the motor 21 of the window regulator 20 or the light control device 30, and the controlled object of the control switch 41 is switched by action of the changeover switch 42.

When the motor 21 is selected as the controlled object through action of the changeover switch 42, the motor 21 operates as follows through action of the control switch 41.

When the control switch 41 is arranged in the first position 101, the motor 21 rotates in the forward direction. In the present embodiment, rotation of the motor in the forward direction raises the light control glass 90. When the control switch 41 is arranged in the second position 102, the motor 21 rotates in the reverse direction. In the present embodiment, rotation of the motor in the reverse direction lowers the light control glass 90. When the control switch 41 is arranged in the reference position 100, the motor 21 is stopped. In this manner, the motor 21 is controlled by operation of the control switch 41, so that the light control glass 90 is moved.

When the light control device 30 is selected as the controlled object of the operation of the changeover switch 42, the light control device 30 operates as follows through action of the control switch 41.

When the control switch 41 is arranged in the first position 101, the light control device 30 gradually increases the potential difference between the two transparent electrode layers 92, 92. If the light control glass 90 includes a liquid crystal sheet, the light transmittance of the light control glass 90 is gradually increased.

When the control switch 41 is arranged in the second position 102, the light control device 30 gradually decreases the potential difference between the two transparent electrode layers 92. If the light control glass 90 includes a liquid crystal sheet, the light transmittance of the light control glass 90 is gradually decreased.

When the control switch 41 is arranged in the reference position 100, the light control device 30 does not change the potential difference between the two transparent electrode layers 92, 92. At this time, the light transmittance of the light control glass 90 does not change. In this manner, the light control device 30 is controlled by operation of the control switch 41, so that the light transmittance of the light control glass 90 is adjusted.

Operation of the window control device 10 will now be described.

As described above, the window control device 10 includes the window regulator 20 and the light control device 30. The light control device 30 is attached to the motor control device 23 of the window regulator 20, and the operation system is shared. Therefore, the overall size of the window control device 10 is compact compared with a case in which the window regulator 20 and the light control device 30 are independently installed in the vehicle door 1.

The window control device 10 of the present embodiment achieves the following advantages.

(1) The window control device 10 includes the window regulator 20 and the light control device 30. The light control device 30 is attached to one of the components (for example, the housing) constituting the window regulator 20. With this configuration, the window regulator 20 in the vehicle door 1 mounts the light control device 30 in the vehicle door 1, eliminating the trouble of separately installing the window regulator 20 and the light control device 30 in the vehicle door 1. As described above, the window control device 10 reduces the workload in the manufacture and the troublesomeness of the assembly of the vehicle door 1.

(2) The operation unit 40 of the window control device 10 has an operation function of moving the light control glass 90 and an operation function of adjusting the light transmittance of the light control glass 90. The window control device 10 does not separately include an operation unit for moving the light control glass 90 and an operation unit for adjusting the amount of light through the light control glass 90, and these operation units are integrated in the single operation unit 40. Therefore, compared to a case in which it is necessary to separately install an operation unit for movement and an operation unit for adjusting the amount of light, the work of installing the operation unit 40 in the vehicle door 1 is simplified. Therefore, the window control device 10 reduces the workload in the manufacture and the troublesomeness of the assembly of the vehicle door 1 compared to a configuration that includes two operation units 40 each corresponding to either the movement or the amount-of-light adjustment of the light control glass 90.

(3) The operation unit 40 includes the control switch 41 and the changeover switch 42 for switching the operation function of the control switch 41. This configuration allows the function of the control switch 41 to be switched based on the switching of the changeover switch 42.

The window control device 10 according to the present embodiment can be used to control the light control glasses 90 on the side of the driver's seat and the light control glasses 90 on the sides of the passenger seats (including the front passenger seat). The window control device 10 is mounted in each of the vehicle doors 1.

Second Embodiment

With reference to FIGS. 8 to 13, a window control device 11 according to a second embodiment will now be described.

Figure 8:
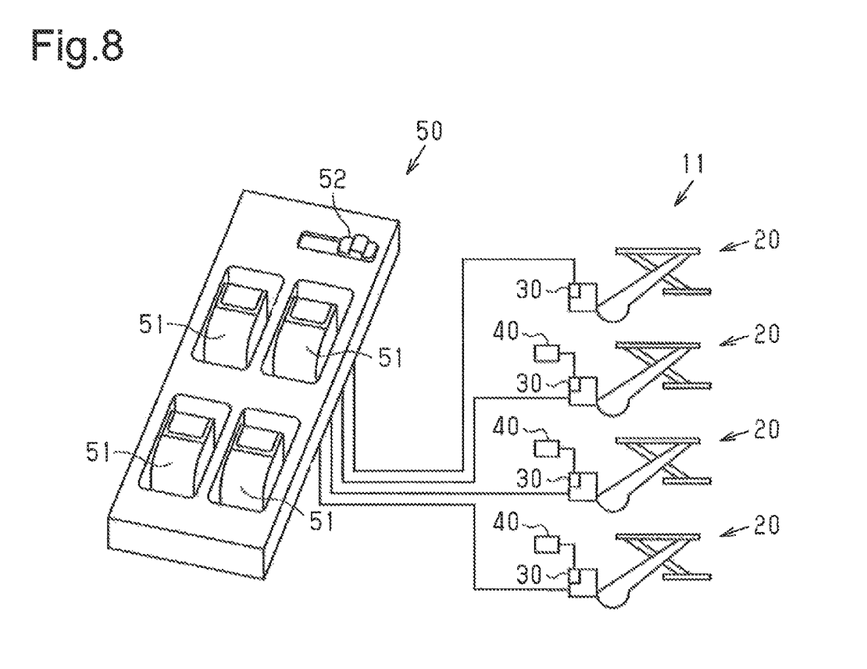
FIG. 8 is a schematic diagram of a window control device according to a second embodiment.

The window control device 11 according to the present embodiment controls movement of and the amount of light through at least two light control glasses 90.

In the present embodiment, as an example, a description will be given of the window control device 11 installed in a vehicle having four vehicle doors 1.

As shown in FIG. 8, the window control device 11 includes four window regulators 20, four light control devices 30 installed in the vehicle doors 1, three operation units 40 on the sides of the passenger seats, and an operation unit 50 on the side of the driver's seat. The operation unit 50 on the side of the driver's seat is an operation device for controlling the four window regulators 20 and the four light control devices 30.

The three operation units 40 on the sides of the passenger seats are installed in the vehicle doors 1 on the sides of the passenger seats and have the same structure as the operation unit 40 in the first embodiment. The light control glass 90 installed in the vehicle door 1 at each passenger seat can be operated with the operation unit 40 installed in that vehicle door 1. Then, by operating a restriction switch 52 (described below) on the side of the driver's seat, the operation of the light control glasses 90 with the operation units 40 of the vehicle doors 1 on the sides of the passenger seats is restricted.

The operation unit 50 is installed in the vehicle door 1 on the side of the driver's seat.

The operation unit 50 includes four control switches 51 corresponding to the four light control glasses 90 and the restriction switch 52 for restricting movement and amount-of-light adjustment of the light control glasses 90.

Each control switch 51 is used for movement operation and amount-of-light adjusting operation of the light control glass 90 of the vehicle door 1 that corresponds to that control switch 51. The control switches 51 have a structure similar to that of the control switch 41 described in the first embodiment.

The restriction switch 52 restricts movement and amount-of-light adjustment of the light control glasses 90 of the vehicle doors 1. That is, the restriction switch 52 restricts operation of the light control glass 90 through the operation unit 40 of each vehicle door 1 and operation of the light control glass 90 of each vehicle door 1 through the operation unit 50 on the side of the driver's seat.

The restriction switch 52 is switched between a lock position, an unlock position, and an amount-of-light adjustment position.

The lock position is a position for permitting movement of the light control glass 90 on the side of the driver's seat, prohibiting movement of the three light control glasses 90 on the sides of the passenger seats, and prohibiting amount-of-light adjustment of the light control glass 90 on the side of the driver's seat and the three light control glasses 90 on the sides of the passenger seats.

The unlock position is a position for permitting movement of the light control glass 90 on the side of the driver's seat and the three light control glasses 90 at the passengers seats and prohibiting amount-of-light adjustment of the light control glass 90 on the side of the driver's seat and the three light control glasses 90 at the passengers seats.

The amount-of-light adjustment position is a position for prohibiting movement of the light control glass 90 on the side of the driver's seat and the three light control glasses 90 at the passengers seats and permitting amount-of-light adjustment of the light control glass 90 on the side of the driver's seat and the three light control glasses 90 at the passengers seats.

Permission and prohibition of movement of the light control glasses 90 are executed, for example, in each window regulator 20, by permitting and stopping power supply to the motor 21, permitting and disconnecting the power transmission between the motor 21 and the power transmission mechanism 22, connecting and disconnecting a junction in the middle of the wiring from the control switch 51 to the motor control device 23, and changing the content of a command from the motor control device 23 to the motor 21.

Permission and prohibition of amount-of-light adjustment of the light control glasses 90 are performed, for example, by connecting and disconnecting a junction in the middle of the wiring from the control switch 51 to the light control device 30, and changing the content of a command from the light control device 30.

Figure 9:
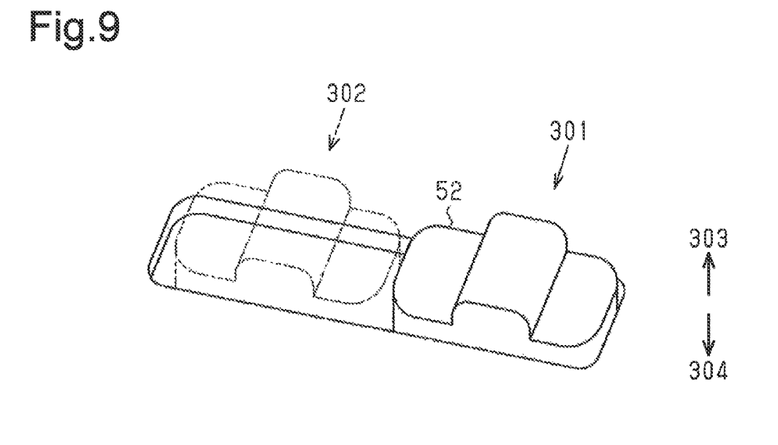
FIG. 9 is a perspective view of a first example of a restriction switch in the window control device according to the second embodiment.
Figure 10:
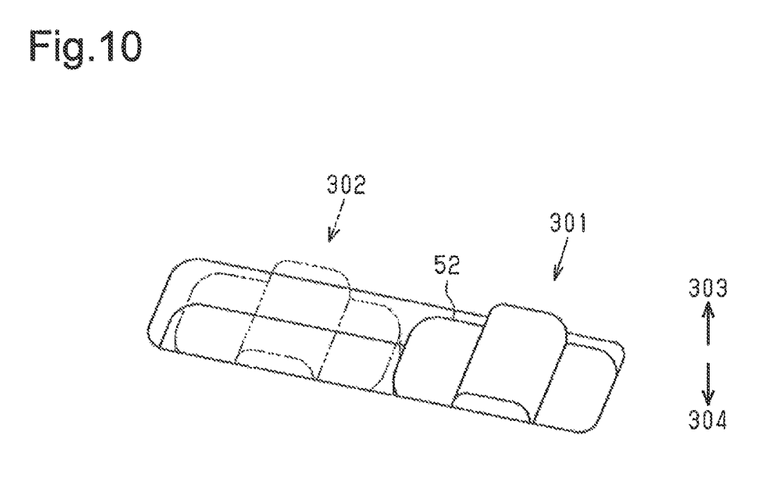
FIG. 10 is a perspective view of the first example of the restriction switch in the window control device according to the second embodiment.

A first example of the restriction switch 52 will now be described with reference to FIGS. 9 and 10.

The restriction switch 52 is configured as a slide and push switch. The restriction switch 52 moves between a first position 301 and a second position 302 in the sliding direction and moves between an upper position 303 and a lower position 304 in the pushing direction.

The restriction switch 52 restricts movement of the light control glasses 90 by being operated in the sliding direction. For example, when arranged in the first position 301, the restriction switch 52 prohibits movement of the light control glasses 90 on the sides of the passenger seats, while permitting movement of the light control glass 90 on the side of the driver's seat. When arranged in the second position 302, the restriction switch 52 permits movement of the light control glasses 90 on the sides of the passenger seats. When pushed down, that is, when arranged in the lower position 304, the restriction switch 52 permits amount-of-light adjustment of all the light control glasses 90 and prohibits movement of all the light control glasses 90. When pushed again in the lower position 304, that is, when arranged in the upper position 303, the restriction switch 52 prohibits amount-of-light adjustment of all the light control glasses 90.

Figure 11:
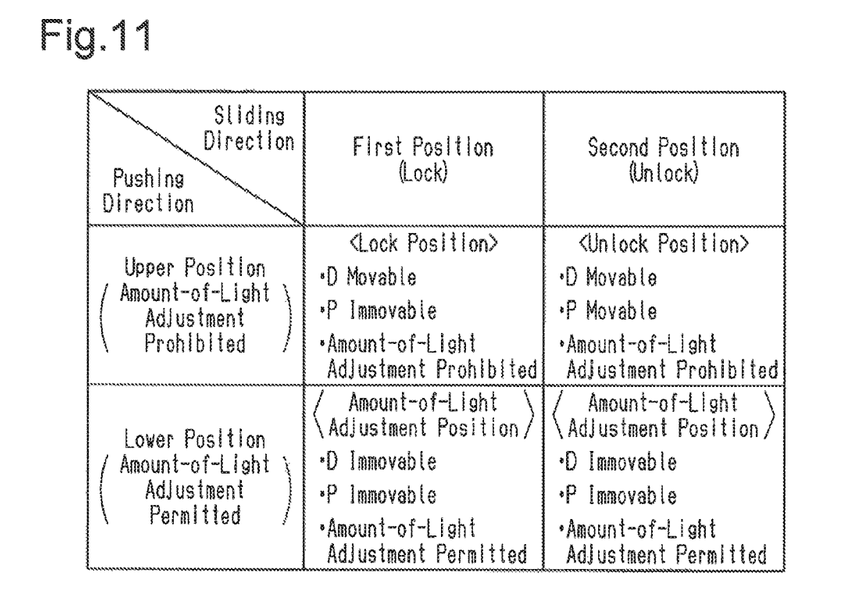
FIG. 11 is a table showing permitted and prohibited items for the light control glass in relation to each arrangement of the restriction switch.

With reference to the table shown in FIG. 11, the relationship of the positions of the restriction switch 52 with the lock position, the unlock position, and the amount-of-light adjustment position will be described.

When arranged in the first position 301 in the sliding direction and in the upper position 303 in the pushing direction, the position of the restriction switch 52 corresponds to the above described lock position. That is, in this state, the light control glass 90 on the side of the driver's seat can be moved (D movable), the light control glasses 90 on the sides of the passenger seats are immovable (P immovable), and the amount of light through none of the light control glasses 90 can be adjusted.

When arranged in the second position 302 in the sliding direction and in the upper position 303 in the pushing direction, the position of the restriction switch 52 corresponds to the above described unlock position. That is, in this state, the light control glass 90 on the side of the driver's seat can be moved (D moveable), the light control glasses 90 on the sides of the passenger seats are movable (P movable), and the amount of light through none of the light control glasses 90 can be adjusted.

When in the first position 301 or the second position 302 in the sliding direction and in the lower position 304 in the pushing direction, the restriction switch 52 is in the above described amount-of-light adjustment position. In this state, the light control glass 90 on the side of the driver's seat cannot be moved (D immovable), the light control glasses 90 on the sides of the passenger seats are movable (P movable), and the amount of light through all the light control glasses 90 can be adjusted.

The window control device 11 of the present embodiment achieves the following advantages.

The restriction switch 52 of the window control device 11 commands the window regulators 20 to restrict movement of the light control glasses 90 and commands the light control devices 30 to restrict amount-of-light adjustment of the light control glasses 90. The restriction switch 52 has the above-described lock position, unlock position, and amount-of-light adjustment position. With this configuration, movement of the light control glasses 90 and amount-of-light adjustment of the light control glasses 90 can be restricted by operating the single restriction switch 52.

The restriction switch 52 described as the first example can be slid and pushed, and moves between the first position 301 and the second position 302 in the sliding direction and between the upper position 303 and the lower position 304 in the pushing direction. Each of the lock position, the unlock position, and the amount-of-light adjustment position, which have the above-described functions, is associated with one of the multiple arrangements of the restriction switch 52.

With this configuration, by sliding the restriction switch 52, the movement restriction state of the light control glasses 90 is switched. Further, the pushing operation of the restriction switch 52 switches the restriction of the amount-of-light adjusting operation (see FIG. 11). That is, regardless of the position of the restriction switch 52 in the sliding direction, the restriction state of the amount-of-light adjusting operation can be switched only by pushing the restriction switch 52. Thus, it is possible to quickly switch, in response to a sudden change in the external light, from the state in which movement of the light control glasses 90 can be controlled to the state in which the amount of light can be adjusted.

Figure 12:
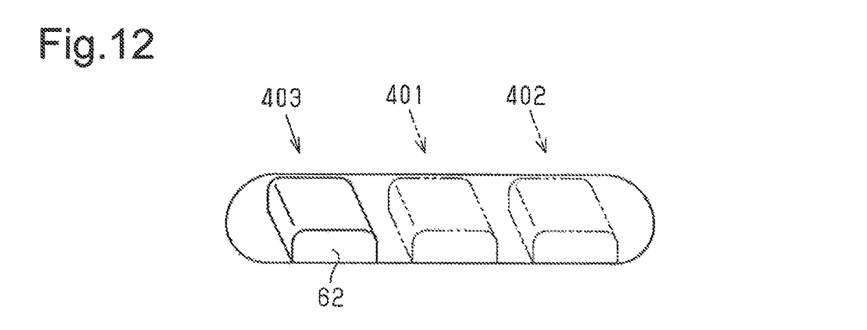
FIG. 12 is a perspective view of a second example of the restriction switch in the window control device according to the second embodiment.

A second example of a restriction switch 62 will now be described with reference to FIG. 12.

The restriction switch 62 is slidable and can be maintained in any of three positions in the sliding direction.

A first position 401 (for example, a position between the other two positions) of the three positions corresponds to the above-described lock position. A second position 402 (for example, the position on the right side in the vehicle width direction) of the three positions corresponds to the above-described unlock position. A third position 403 (for example, the position on the left side in the vehicle width direction) of the three positions corresponds to the above-described amount-of-light adjustment position.

Advantages of the restriction switch 62 will now be described.

The restriction switch 62 is slidable and can be maintained in any of three positions in the sliding direction. With this configuration, since the restriction switch 62 does not move when pushed, the switch structure is simplified.

Figure 13:
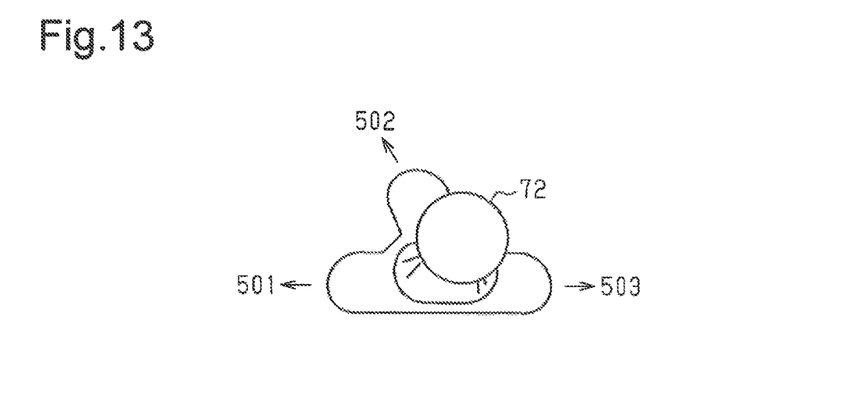
FIG. 13 is a perspective view of a third example of the restriction switch in the window control device according to the second embodiment.

A third example of a restriction switch 72 will now be described with reference to FIG. 13.

The restriction switch 72 is movable in three directions from the center position. The end position in a first direction 501 among the three directions corresponds to the above-described lock position. The end position in a second direction 502 among the three directions corresponds to the above-described unlock position. The end position in a third direction 503 among the three directions corresponds to the above-described amount-of-light adjustment position.

In response to the restriction switch 72 being operated to the end position in one of the three directions, a signal corresponding to the end position in that operation direction is output. For example, operation of the restriction switch 72 in the first direction 501 causes a signal corresponding to the lock position to be output. Operation of the restriction switch 72 in the second direction 502 causes a signal corresponding to the unlock position to be output. Operation of the restriction switch 72 in the third direction 503 causes a signal corresponding to the amount-of-light adjustment position to be output.

Advantages of the restriction switch 72 will now be described.

The restriction switch 72 is movable in three directions from the center position, and each of the lock position, the unlock position, and the amount-of-light adjustment position is assigned to the end position of one of the three directions. With this configuration, it is possible to switch to a desired restriction state by one operation from the center position. That is, since operation for switching to a desired restriction state does not involve two or more actions, the switching operation is simple and the operability is improved.

Third Embodiment

Figure 14:
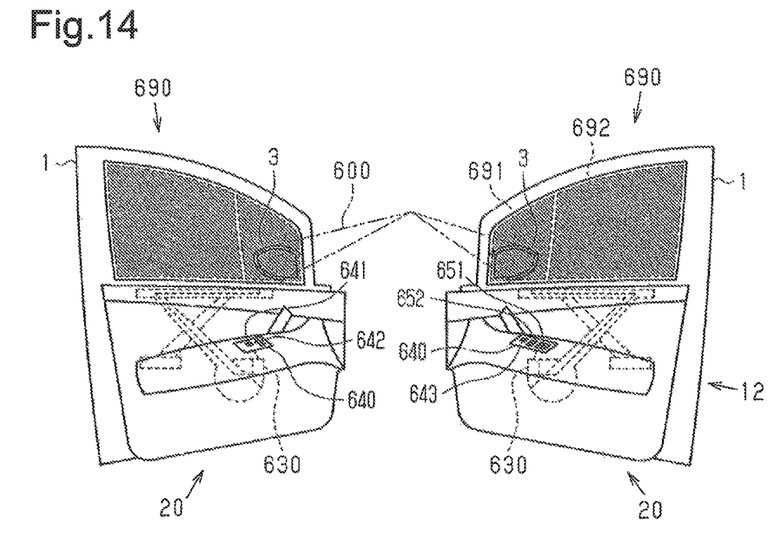
FIG. 14 is a schematic diagram of a window control device according to a third embodiment.
Figure 15:
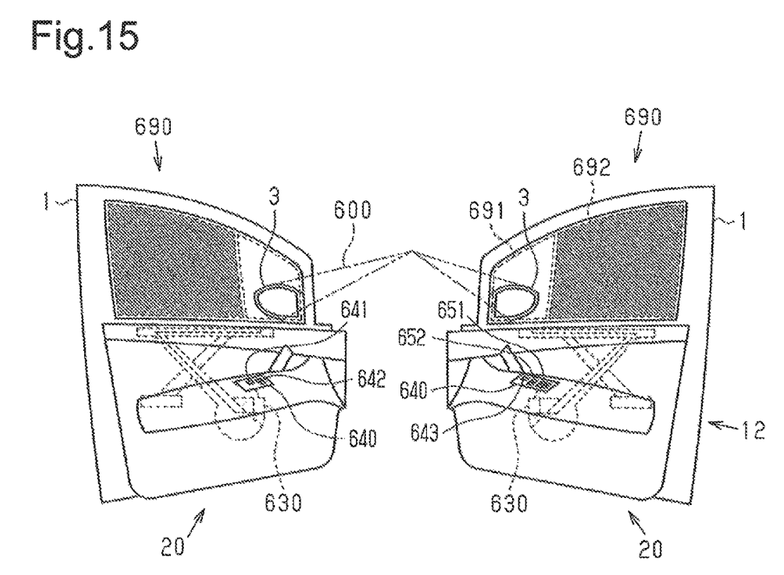
FIG. 15 is a schematic diagram of the window control device according to the third embodiment.

With reference to FIGS. 14 and 15, a window control device 12 according to a third embodiment will now be described. The window control device 12 according to the present embodiment is applied to a vehicle in which light control glasses 690 of a segmented light control type are installed in the vehicle doors 1 on the side of the driver's seat and the front passenger seat. The window control device 12 controls movement of the light control glasses 690 and adjusts the amount of light through the light control glasses 690 of a segmented light control type.

The light control glass 690 of a segmented light control type is segmented into two or more areas, the light transmittance of each area can be controlled independently of the other areas. Specifically, a pair of transparent electrode layers is provided to correspond to each of the areas, and a potential difference is controlled in each pair of the transparent electrode layers.

The light control glasses 690 of a segmented light control type are installed in the vehicle door 1 on the side of the driver's seat and the vehicle door 1 on the side of the front passenger seat. The light control glasses 690 of a segmented light control type are each divided into a first area 691 close to a side mirror 3 and a second area 692 behind (on the rear side in the vehicle front-rear direction of) the first area 691. The first area 691 is configured to include the area where the light control glass 690 intersects with a field of view 600 of the driver sitting in the driver's seat when the driver looks at the side mirror 3.

The window control device 12 includes a window regulator 20 on the side of the driver's seat, a light control device 630 on the side of the driver's seat, an operation unit 640 on the side of the driver's seat, a window regulator 20 on the side of the front passenger seat, a light control device 630 on the side of the front passenger seat, and an operation unit 640 on the side of the front passenger seat. The operation unit 640 on the side of the front passenger seat includes various switches described in the first embodiment, that is, a control switch 641 and a changeover switch 642.

The operation unit 640 on the side of the driver's seat includes a partial light control switch 643 in addition to various switches described in the second embodiment, that is, a control switch 651 and a restriction switch 652.

The partial light control switch 643 is a switch for changing the light transmittance of the first area 691. The partial light control switch 643 is a push switch. The partial light control switch 643 is lowered to a predetermined position by being pushed and returns to the original position when the pushing force is removed. When pushed, the partial light control switch 643 outputs a command signal to the light control device 630 on the side of the driver's seat and the light control device 630 on the side of the front passenger seat. The command signal is designed to make the side mirror 3 visible.

Operation of the window control device 12 will now be described.

When receiving no command signals, the light control device 630 on the side of the driver's seat simultaneously controls the amount of light through the first area 691 and the second area 692 of the light control glass 690 on the side of the driver's seat based on operation of the control switch 651 of the operation unit 640 on the side of the driver's seat. In contrast, when receiving a command signal, the light control device 630 on the side of the driver's seat controls the amount of light through only the first area 691 in the light control glass 690 on the side of the driver's seat such that the light transmittance of the first area 691 is greater than or equal to a specified value. The specified value is higher than the light transmittance at which the driver seated in the driver's seat can see the image on the side mirror 3 (the image reflected by the side mirror 3).

When receiving no command signals, the light control device 630 on the side of the front passenger seat simultaneously controls the amount of light through the first area 691 and the second area 692 of the light control glass 690 on the side of the front passenger seat based on operation of the control switch 641 of the operation unit 640 on the side of the front passenger seat and operation of the control switch 651 of the operation unit 640 on the side of the driver's seat. In contrast, when receiving a command signal, the light control device 630 on the side of the front passengers seat controls the amount of light through only the first area 691 in the light control glass 690 on the side of the front passenger seat such that the light transmittance of the first area 691 is greater than or equal to the specified value.

The window control device 12 of the present embodiment achieves the following advantages.

The window control device 12 includes the partial light control switch 643. The partial light control switch 643 outputs a command for partially adjusting the amount of light through the light control glasses 690 on the side of the driver's seat and the side of the front passenger seat. The two light control devices 630 on the side of the driver's seat and the side of the front passenger seat increase the light transmittance of the first areas 691 to a value at which the images on the side mirrors 3 become visible based on operation of the partial light control switch 643.

This configuration allows the images on the side mirrors 3 to be visible while maintaining a low light transmittance of the areas that do not prevent the driver from seeing the side mirrors 3 in the light control glasses 690 (that is, the second areas 692) on the side of the driver's seat and the side of the front passenger seat. That is, instead of increasing the light transmittance of the entire light control glasses 690 on the side of the driver's seat and the side of the front passenger seat, the light transmittance can be increased only in the first areas 691. This allows the side mirrors 3 to be visible while blocking unnecessary external light.

Fourth Embodiment

Figure 16:
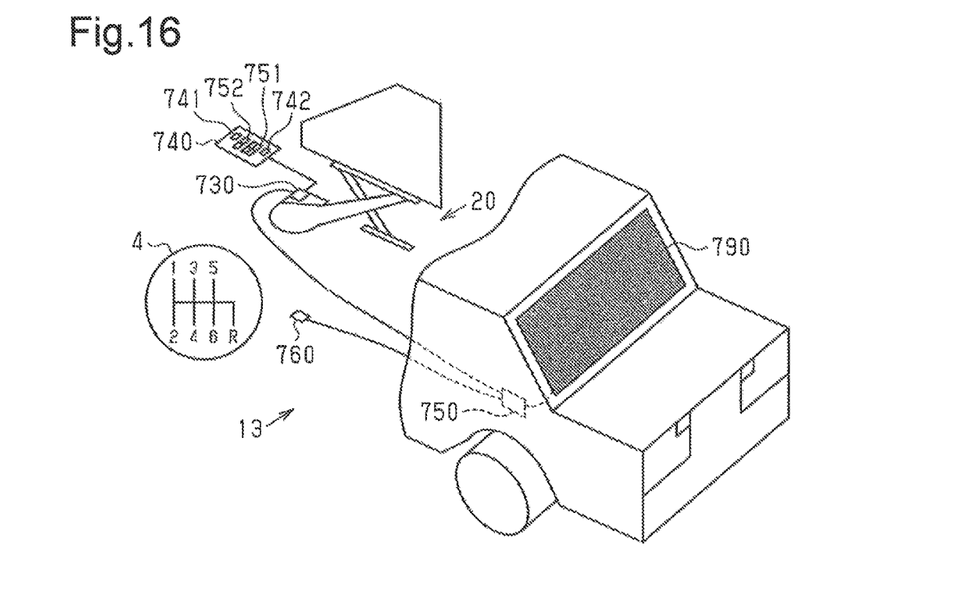
FIG. 16 is a schematic diagram of a window control device according to a fourth embodiment.
Figure 17:
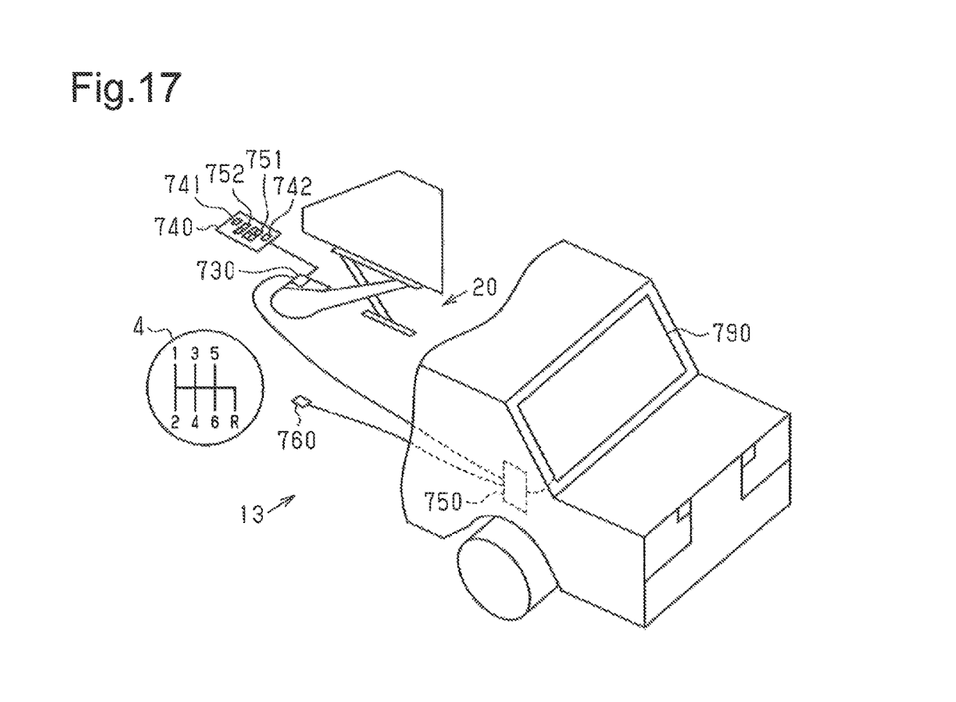
FIG. 17 is a schematic diagram of the window control device according to the fourth embodiment.

With reference to FIGS. 16 and 17, a window control device 13 according to a fourth embodiment will now be described. The window control device 13 according to the present embodiment is applied to a vehicle in which a light control glass 790 (hereinafter referred to as a rear light control glass 790) is installed in the rear of a vehicle.

A window control device 13 on the side of the driver's seat includes a window regulator 20 installed in the vehicle door 1 on the side of the driver's seat, a light control device 730, an operation unit 740, a light control device for the rear light control glass 790 (hereinafter referred to as a rear light control device 750), and a movement information acquiring device 760.

In addition to the operation switches described in the second embodiment, or a control switch 751 and a restriction switch 752, the operation unit 740 preferably includes a control switch 742 for controlling the light transmittance of the rear light control glass 790. Also, the operation unit 740 preferably includes a rear light control switch 741.

The rear light control switch 741 is a switch for making the rear light control glass 790 transparent. The rear light control switch 741 is a push switch. The rear light control switch 741 is lowered to a predetermined position by being pushed and returns to the original position when the pushing force is removed. When pushed, the rear light control switch 741 outputs a command signal (hereinafter referred to as a transparency signal) to the rear light control device 750. The transparency signal is a signal for making the rear light control glass 790 transparent.

The movement information acquiring device 760 acquires information related to the initial motion of backward movement of the vehicle. The information on the initial motion of backward movement of the vehicle includes information concerning the initial motion when the vehicle moves backward, the operation for moving the vehicle backward, and the signal relating to the backward movement output from the vehicle control system mounted on the vehicle. The initial motion when the vehicle moves backward refers to rotation of the wheels, the beginning of the backward movement, or the backward acceleration. The operation for moving the vehicle backward refers to manipulation of a shifter 4 into the reverse position (R). Then, the movement information acquiring device 760 outputs a transparency signal to the rear light control device 750 when acquiring information related to the initial motion of the backward movement of the vehicle.

When receiving no transparency signal, the rear light control device 750 controls the amount of light through the rear light control glass 790 based on operation of the control switch 742 of the operation unit 740.

When receiving a transparency signal, the rear light control device 750 makes the light transmittance of the rear light control glass 790 higher than a reference transmittance. The reference transmittance is a light transmittance at which the outside scenery can be visually identified.

Operation of the window control device 13 of the present embodiment will now be described.

The window control device 13 includes the rear light control device 750 and the movement information acquiring device 760. When the movement information acquiring device 760 acquires information on the initial motion of backward movement of the vehicle, the rear light control device 750 sets the light transmittance of the rear light control glass 790 to be higher than the reference transmittance, at which the outside scenery can be visually identified.

With this configuration, when the vehicle is moved backward with a low light transmittance of the rear light control glass 790, the light transmittance of the rear light control glass 790 is increased based on the information on the initial motion of the backward movement of the vehicle. This allows the driver to check behind when moving the vehicle backward without performing any operation for increasing the light transmittance of the rear light control glass 790, which improves the safety of driving.

OTHER EMBODIMENTS

The structure of the control switch 41 and the changeover switch 42 in the first embodiment and the structure of the restriction switch 52 in the second embodiment are not limited. For example, instead of a mechanical type (for example, the sliding action or rotation), a touch-type configuration (for example, a touch panel) may be used. The same applies to the other embodiments.

In the first embodiment, the structure in which the light control device 30 is attached to one of the components constituting the window regulator 20 (hereinafter referred to as an integrated structure) is not limited to the example shown in the embodiment. For example, the control circuitry of the light control device 30 and the control circuitry of the window regulator 20 may be configured as one circuit on a single semiconductor substrate, or may be configured as independent circuits on a single wiring substrate. These structures are also examples of the integrated structure.

Therefore, the present examples and embodiments are to be considered as illustrative and not restrictive and the invention is not to be limited to the details given herein, but may be modified within the scope and equivalence of the appended claims.

The invention claimed is:

1. A window control device comprising:
at least one window regulator that controls movement of a light control glass that is installed in a vehicle door and configured to be adjusted for its light transmittance;
at least one light control device that controls the light transmittance of the light control glass,
wherein the at least one light control device is attached to a portion of the at least one window regulator; and
an operation unit that has a plurality of operation functions,
wherein the operation unit includes
an operation function of moving the light control glass,
an operation function of adjusting the light transmittance of the light control glass,
a control switch that is commonly used for movement operation for moving the light control glass and amount-of-light adjusting operation for adjusting the light transmittance of the light control glass, and
a changeover switch that switches the operation function of the control switch between the movement operation and the amount-of-light adjusting operation.

2. The window control device according claim 1, wherein the at least one window regulator comprises
a driver's-side window regulator that controls movement of a light control glass that is installed in a vehicle door on a side of a driver's seat and is configured to be adjusted for its light transmittance, and
a passenger-side window regulator that controls movement of a light control glass that is installed in a vehicle door on a side of a front passenger seat and is configured to be adjusted for its light transmittance,
the at least one light control device further comprises
a driver's-side light control device that controls the light transmittance of the light control glass on the side of the driver's seat, and
a passenger-side light control device that controls the light transmittance of the light control glass on the side of the front passenger seat, and
the window control device further comprises a partial light control switch that outputs a command for partially adjusting an amount of light through the light control glass on the side of the driver's seat and an amount of light through the light control glass on the side of the front passenger seat, wherein
the light control glass on the side of the driver's seat and the light control glass on the side of the front passenger seat are each segmented into a first area and a second area, wherein the light transmittance of each area is controlled independently of the other area,
each first area includes an area where the light control glass intersects with a field of view of a driver when the driver looks at a side mirror,
each second area is an area inside a window frame and rearward of the corresponding first area, and
based on operation of the partial light control switch, the driver's-side light control device and the passenger-side light control device increase the light transmittance of the first areas to a value at which images on the side mirrors become visible, independently of control of the light transmittance of the second areas.

3. The window control device according to claim 1, further comprising:
a rear light control device that controls an amount of light through a light control glass installed in rear of the vehicle; and
a movement information acquiring device that acquires information related to an initial motion of backward movement of the vehicle,
wherein, when the movement information acquiring device acquires information on the initial motion of backward movement of the vehicle, the rear light control device sets the light transmittance of the rear light control glass to be higher than a reference transmittance for visually identifying scenery outside of the vehicle.

4. A window control device comprising:
a plurality of window regulators that control movement of light control glasses that are installed in vehicle doors on a side of a driver's seat and on a side of a passenger seat, wherein each light control glass is configured to be adjusted for its light transmittance;
a plurality of light control devices that controls the light transmittance of the light control glasses; and
a restriction switch that commands the window regulators to restrict movement of the light control glasses and commands the light control devices to restrict the adjustment of the light transmittance of the light control glasses,
wherein the restriction switch includes
a lock position where the restriction switch permits movement of the light control glass on the side of the driver's seat, prohibits movement of the light control glass on the side of the passenger seat, and prohibits an amount-of-light adjustment of the light control glass on the side of the driver's seat and the light control glass on the side of the passenger seat,
an unlock position where the restriction switch permits movement of the light control glass on the side of the driver's seat and the light control glass on the side of the passenger seat, and prohibits the amount-of-light adjustment of the light control glass on the side of the driver's seat and the light control glass on the side of the passenger seat, and
an amount-of-light adjustment position where the restriction switch prohibits movement of the light control glass on the side of the driver's seat and the light control glass on the side of the passenger seat, and permits the amount-of-light adjustment of the light control glass on the side of the driver's seat and the light control glass on the side of the passenger seat.

5. The window control device according to claim 4, wherein the restriction switch is configured to be slid and pushed, is movable between a first position and a second position in a sliding direction, and is movable between an upper position and a lower position in a pushing direction, the lock position is an arrangement of the restriction switch when the restriction switch is in the first position in the sliding direction and in the upper position in the pushing direction, the unlock position is an arrangement of the restriction switch when the restriction switch is in the second position in the sliding direction and in the upper position in the pushing direction, and the amount-of-light adjustment position is an arrangement of the restriction switch when the restriction switch is in the first position or the second position in the sliding direction and in the lower position in the pushing direction.

6. The window control device according to claim 4, wherein the restriction switch is slidable and configured to be maintained in any of three positions in a sliding direction, the lock position is a first position in the three positions, the unlock position is a second position in the three positions, and the amount-of-light adjustment position is a third position in the three positions.

7. The window control device according to claim 4, wherein the restriction switch is movable in three directions from a center position, the lock position is an end position in a first direction in the three directions, the unlock position is an end position in a second direction in the three directions, and the amount-of-light adjustment position is an end position in a third direction in the three positions.

8. The window control device according to claim 4, wherein the plurality of window regulators comprise a driver's-side window regulator that controls movement of a light control glass that is installed in a vehicle door on a side of a driver's seat and is configured to be adjusted for its light transmittance, and a passenger-side window regulator that controls movement of a light control glass that is installed in a vehicle door on a side of a front passenger seat and is configured to be adjusted for its light transmittance, the plurality of light control devices comprise a driver's-side light control device that controls the light transmittance of the light control glass on the side of the driver's seat, and a passenger-side light control device that controls the light transmittance of the light control glass on the side of the front passenger seat, and the window control device further comprises a partial light control switch that outputs a command for partially adjusting an amount of light through the light control glass on the side of the driver's seat and an amount of light through the light control glass on the side of the front passenger seat, wherein the light control glass on the side of the driver's seat and the light control glass on the side of the front passenger seat are each segmented into a first area and a second area, wherein the light transmittance of each area is controlled independently of the other area, each first area includes an area where the light control glass intersects with a field of view of a driver when the driver looks at a side mirror, each second area is an area inside a window frame and rearward of the corresponding first area, and based on operation of the partial light control switch, the driver's-side light control device and the passenger-side light control device increase the light transmittance of the first areas to a value at which images on the side mirrors become visible, independently of control of the light transmittance of the second areas.

9. The window control device according to claim 4, further comprising:

a rear light control device that controls an amount of light through a light control glass installed in rear of the vehicle; and a movement information acquiring device that acquires information related to an initial motion of backward movement of the vehicle, wherein, when the movement information acquiring device acquires information on the initial motion of backward movement of the vehicle, the rear light control device sets the light transmittance of the rear light control glass to be higher than a reference transmittance for visually identifying scenery outside of the vehicle.

* * * * *